(12) United States Patent
Pereira et al.

(10) Patent No.: US 11,985,269 B2
(45) Date of Patent: May 14, 2024

(54) VOICE MEDIA DECOUPLING

(71) Applicant: Intermedia.net, Inc., Sunnyvale, CA (US)

(72) Inventors: Vladimir Pereira, Sunnyvale, CA (US); Javier Ruiz Sierra, Sunnyvale, CA (US)

(73) Assignee: Intermedia.net, Inc., Sunnyvale, CA (US)

( * ) Notice: Subject to any disclaimer, the term of this patent is extended or adjusted under 35 U.S.C. 154(b) by 46 days.

(21) Appl. No.: 17/514,374

(22) Filed: Oct. 29, 2021

(65) Prior Publication Data

US 2023/0139884 A1 May 4, 2023

(51) Int. Cl.
| | |
|---|---|
| *H04M 3/00* | (2006.01) |
| *H04L 12/66* | (2006.01) |
| *H04L 65/1104* | (2022.01) |
| *H04M 3/493* | (2006.01) |
| *H04M 3/58* | (2006.01) |
| *H04M 5/00* | (2006.01) |

(52) U.S. Cl.
CPC ....... *H04M 3/4931* (2013.01); *H04L 65/1104* (2022.05); *H04M 3/58* (2013.01); *H04M 2201/42* (2013.01); *H04M 2203/2066* (2013.01)

(58) Field of Classification Search
CPC ............. H04M 3/5166; H04M 3/5237; H04M 2201/42; H04M 3/5175; H04M 2203/355; H04M 3/493; H04M 2203/254; H04M 3/5191; H04M 3/5233; H04M 2203/655; H04M 3/5232; H04M 3/5183; H04M 11/06; H04L 65/1104; H04L 67/53; H04L 65/40; H04L 67/56; H04L 67/562; H04L 67/62; H04L 67/306; H04L 67/1001; G06F 3/0482; G06F 3/04817; G06F 8/34; G06F 16/3329
USPC ............. 379/265.09, 266.01, 88.13; 370/352
See application file for complete search history.

(56) References Cited

U.S. PATENT DOCUMENTS

| | | | | |
|---|---|---|---|---|
| 6,707,904 | B1 * | 3/2004 | Judkins | H04M 3/51 379/265.06 |
| 6,978,247 | B1 * | 12/2005 | Bogart | G06Q 10/0631 705/7.12 |
| 8,675,857 | B1 * | 3/2014 | Croak | H04M 3/523 370/352 |
| 9,588,830 | B2 * | 3/2017 | Segre | H04L 65/1069 |
| 10,827,062 | B1 * | 11/2020 | Paiva | H04M 3/5232 |
| 11,146,679 | B1 * | 10/2021 | Meyer | H04M 3/4936 |
| 2004/0030739 | A1 * | 2/2004 | Yousefi'zadeh | G06F 16/2471 709/201 |

(Continued)

*Primary Examiner* — Kharye Pope
(74) *Attorney, Agent, or Firm* — Schwegman, Lundberg & Woessner, P.A.

(57) ABSTRACT

In an example embodiment, a solution is provided that decouples an IVR component from a voice media server, which allows the voice media server to be geographically placed in a location most beneficial to keep digital voice file transmission to a minimum (thus saving bandwidth), while allowing the IVR component to be geographically located anywhere without negatively impacting the bandwidth usage. An additional benefit is that by decoupling the IVR component from the voice media server, the IVR component can be implemented in a way that lets it work with multiple redundant voice media servers simultaneously, allowing one of the voice media servers to become unavailable without impacting service.

20 Claims, 5 Drawing Sheets

(56) References Cited

U.S. PATENT DOCUMENTS

| | | | | |
|---|---|---|---|---|
| 2009/0154666 | A1* | 6/2009 | Rios | G10L 15/26 |
| | | | | 345/168 |
| 2010/0239075 | A1* | 9/2010 | Kobylevsky | G10L 15/22 |
| | | | | 379/88.01 |
| 2010/0257399 | A1* | 10/2010 | Brown | H04L 67/1095 |
| | | | | 707/E17.007 |
| 2010/0278316 | A1* | 11/2010 | Beauregard | H04M 3/42068 |
| | | | | 379/88.01 |
| 2012/0045042 | A1* | 2/2012 | Minert | H04M 3/5125 |
| | | | | 379/88.04 |
| 2012/0047517 | A1* | 2/2012 | Townsend | H04M 3/5191 |
| | | | | 709/227 |
| 2014/0079207 | A1* | 3/2014 | Zhakov | H04M 3/5233 |
| | | | | 379/265.03 |
| 2015/0261628 | A1* | 9/2015 | Bruzzese | G06F 11/2038 |
| | | | | 714/4.11 |
| 2015/0339401 | A1* | 11/2015 | Baldwin | G06F 40/186 |
| | | | | 707/769 |
| 2016/0349830 | A1* | 12/2016 | Omata | G06F 11/16 |
| 2019/0004581 | A1* | 1/2019 | Borlick | G06F 11/2284 |
| 2022/0345571 | A1* | 10/2022 | Chau | H04M 3/567 |

* cited by examiner

VOICE MEDIA DECOUPLING

TECHNICAL FIELD

This application relates generally to interactive voice response (IVR) technology. More specifically, this application relates to a voice media decoupling from an IVR component.

BACKGROUND

Many organizations utilize interactive voice response (IVR) technology to aid in communications with customers. IVR is an automated phone system technology that allows callers to access information via a voice response system of recorded messages without having to speak to a live agent, as well as to utilize menu options via touch tone keypad selection or speech recognition to have their call routed to specific departments.

Commonly, IVR technology is implemented as part of a voice media server. In addition to IVR features, the voice media server also manages the calls themselves, by receiving the calls, storing calls and messages when appropriate, and managing connections to call agents (e.g., live people). Having the IVR technology integrated within the voice media server, however, can lead to technical issues. More particularly, commonly the media server, with the IVR technology (i.e., the entire stack), is stored in a single data center. The geographic location of this data center, however, may be far from the geographical location from where the majority of calls originate. Thus, for example, if the data center is located in Connecticut and the majority of calls originate from Hawaii, a significant number of voice calls (and the significantly sized digital files created during such calls) must be transmitted between Hawaii and Connecticut in order to be processed, which uses bandwidth and slows down call processing. Locating the entire data center, including the IVR, in Hawaii would reduce that bandwidth usage, but creates an issue where the entity providing the IVR functionality is located in Connecticut and wishes to maintain control in Connecticut.

An additional technical problem with integrating the IVR component within the voice media server is that if for some reason the voice media server is inaccessible or otherwise unavailable (such as if it goes down), the IVR functionality also becomes unavailable.

What is needed is a solution that overcomes these technical issues.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a solution is provided that decouples an IVR component from a voice media server, which allows the voice media server to be geographically placed in a location most beneficial to keep digital voice file transmission to a minimum (thus saving bandwidth), while allowing the IVR component to be geographically located anywhere without negatively impacting the bandwidth usage. An additional benefit is that by decoupling the IVR component from the voice media server, the IVR component can be implemented in a way that lets it work with multiple redundant voice media servers simultaneously, allowing one of the voice media servers to become unavailable without impacting service. Furthermore, decoupling the IVR component from the voice media server also allows an implementation where certain IVR scripts may be used to obtain confidential or sensitive data from users without sharing this data with call agents or otherwise storing the data with the voice data stored by the voice media server, preserving privacy and/or anonymity.

Another potential technical problem the present solution overcomes is that some jurisdictions prohibit transmission of certain voice communications to different countries. Using the herein-described decoupled IVR component, it becomes possible to locate the IVR component in a different country than the media server without running afoul of such regulations.

Figure 1:
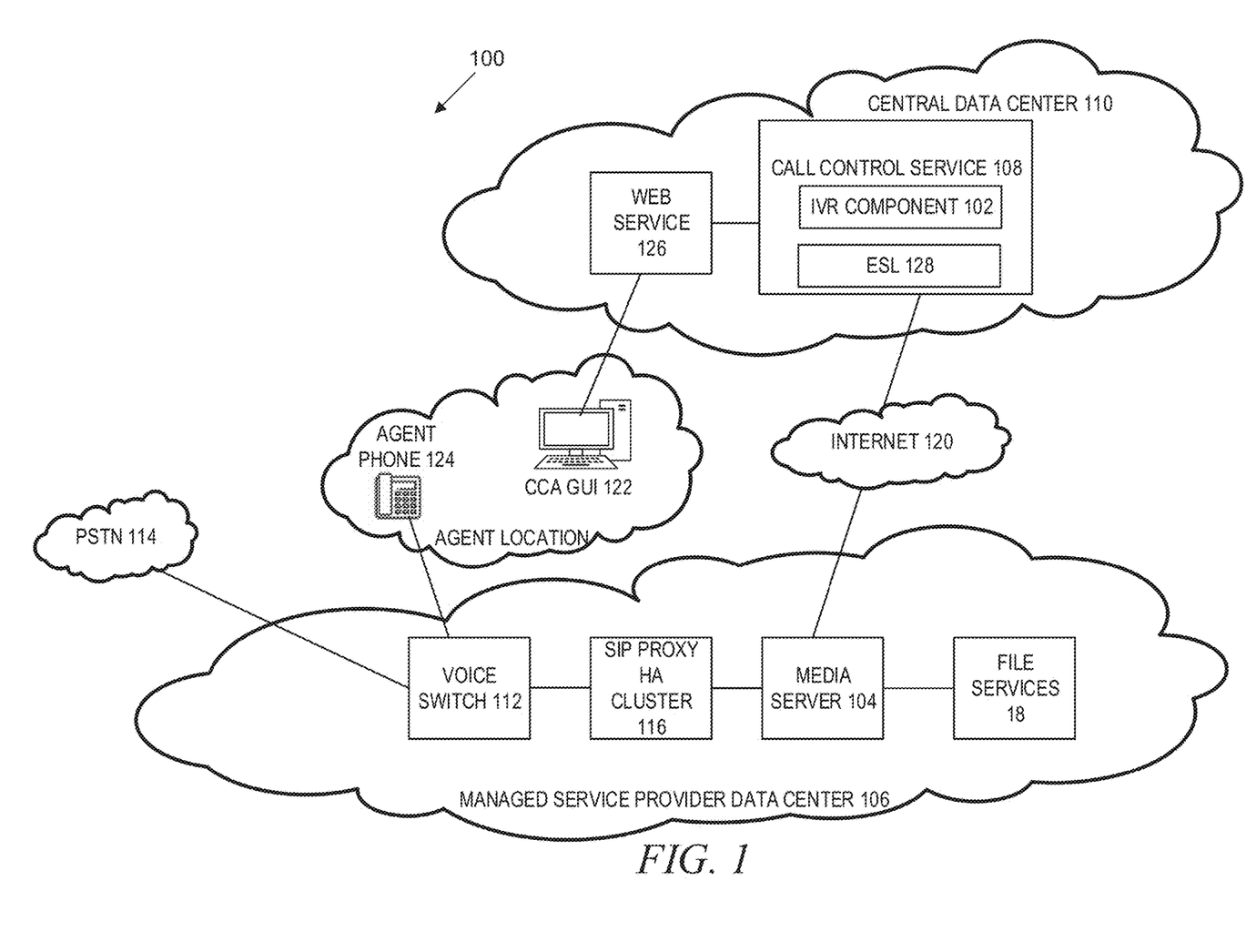
FIG. 1 is a block diagram illustrating a system for call control service deployment in accordance with an example embodiment.

FIG. 1 is a block diagram illustrating a system 100 for call control service deployment in accordance with an example embodiment. Here, rather than integrate an IVR component 102 within a media server 104 at a managed service provider data center 106, the IVR component 102 is integrated in a call control service 108 at a central data center 110.

More particularly, the managed service provider data center 106 includes a voice switch 112 that connects to a public switched telephone network (PSTN) 114. Calls are received at the voice switch 112 from the PSTN 114 and sent to the media server 104. In some example embodiments, calls are also sent to a Session Initiation Protocol (SIP) Proxy high availability cluster 116. The SIP Proxy high availability cluster 116 controls what may be multiple instances of the media server 104, for redundancy purposes (which may include automatic failover, which means that if one instance of the media server 104 goes down, another can take over without human intervention and without loss of service). More particularly, command and control for media servers may be replicated across singular or multiple communication service provider deployments. Additional file services 118, such as retrieval of stored calls, may also be provided from the managed service provider data center 106.

The media server 104 (which may include multiple instances of the media server in redundant configurations) may then connect remotely with the call control service 108 at the central data center 110, via the Internet 120. In an example embodiment, this connection may be via an IP Security (IPSec) Virtual Private Network (VPN) tunnel. The IVR component 102 within the call control service 108 can send one or more scripts to the call control service 108, which can run them when appropriate during a voice call. These scripts may be triggered when the media server 104 detects certain events in the voice call, in accordance with the IVR script being utilized. For example, one such event may be the establishment of the call itself (i.e., when the user first calls and the voice switch picks up the call), at which point an automated script may be executed giving a list of menu options for the user to choose from. Alternatively, the scripts may be triggered based on events from a call control service anywhere graphical user interface (CCA GUI) 122, which may be connected to an agent phone 124 that a human agent uses during a call to speak with the user.

Communication between the IVR component 102 and the CCA GUI 122 may be handled via a web application 126.

Prompts for the IVR scripts may pushed from the IVR component 102 to the media server 104 and stored at the media server 104. Text to speech processing may be performed by the media server 104 and pushed to the IVR component 102, where the text from the user's voice can be used to process the appropriate IVR script. In an example embodiment, an Event Socket Layer (ESL) 128 is used for this purpose. More particularly, the ESL 128 may implement calls to an event socket on the media server 104, which implements an event socket library containing various functions that can be activated by the calls. Example functions include setting a log level (which issues informative messages related to the ESL 128), instantiating a new event object, and initializing a new instance of an ESL connection.

Events triggered during the IVR scripts can then be sent to the call control service 108, which can use them for tracking, reporting, and call control itself. Specifically, call control service 108 may offer a schedule manager to schedule live agent work hours and breaks and generate reports, initiate call recording and screen recording capabilities to monitor agent behavior, track and view agent chat logs, and provide real-time dashboard with information about current and past calls.

The IVR component 102 may also connect to a web application 130. The web application 130 may provide an interface for a user to draw or otherwise create an IVR. This may be a graphical interface rendered on a client device that communicates with the web application 130. The user may be able to click a button that gets the created call flow into an XML or similar file representing the created IVRs/IVR scripts. Thus, it is these XML or similar files that may be transmitted to the media server 104.

In an example embodiment, the media server 104 may actually be a full-service media server 104, which has the capability to provide IVR services using an integrated IVR component, but whose IVR services and/or IVR component have been disabled or otherwise are not utilized. In this manner, an existing media server 104 may be repurposed for use with a decoupled IVR component 102 without needing to completely redesign the media server 104.

In a further example embodiment, the media server 104 may actually comprise a plurality of media servers, each acting as a backup to the other. All the media servers may either store the IVR scripts from the IVR component 102 or may access a shared database storing the IVR scripts. One of these multiple media servers may be utilized as a primary media server at runtime, until and unless it becomes unavailable (either through technical issues with the primary media server itself or with the communications link to the primary media server), at which point the system 100 switches over to one of the backup media servers.

Furthermore, in an example embodiment, the IVR component 102 may be one of a plurality of IVR components 102, each acting as a backup to one another. Indeed, in an example embodiment, there are 3 redundant IVR components 102 for each media server 104. The decoupling of the IVR component 102 and the media server allows for this type of multiple redundancies, where there are multiple IVR components capable of communicating with multiple media servers, thus compensating for any one component/server going down or otherwise becoming unavailable due to technical or other issues.

When updates are needed, the decoupling of the IVR component 102 from the media server 104 allows for the IVR component 102 to be updated independently from the media server 104, thus simplifying updates and making them less risky operationally.

Voice media does not flow back to the central data center 110, thus not introducing quality degrading "hops" to the voice calls, while the voice real-time-processing stays local to the service provider network, including the managed service provider data center 106.

Figure 2:
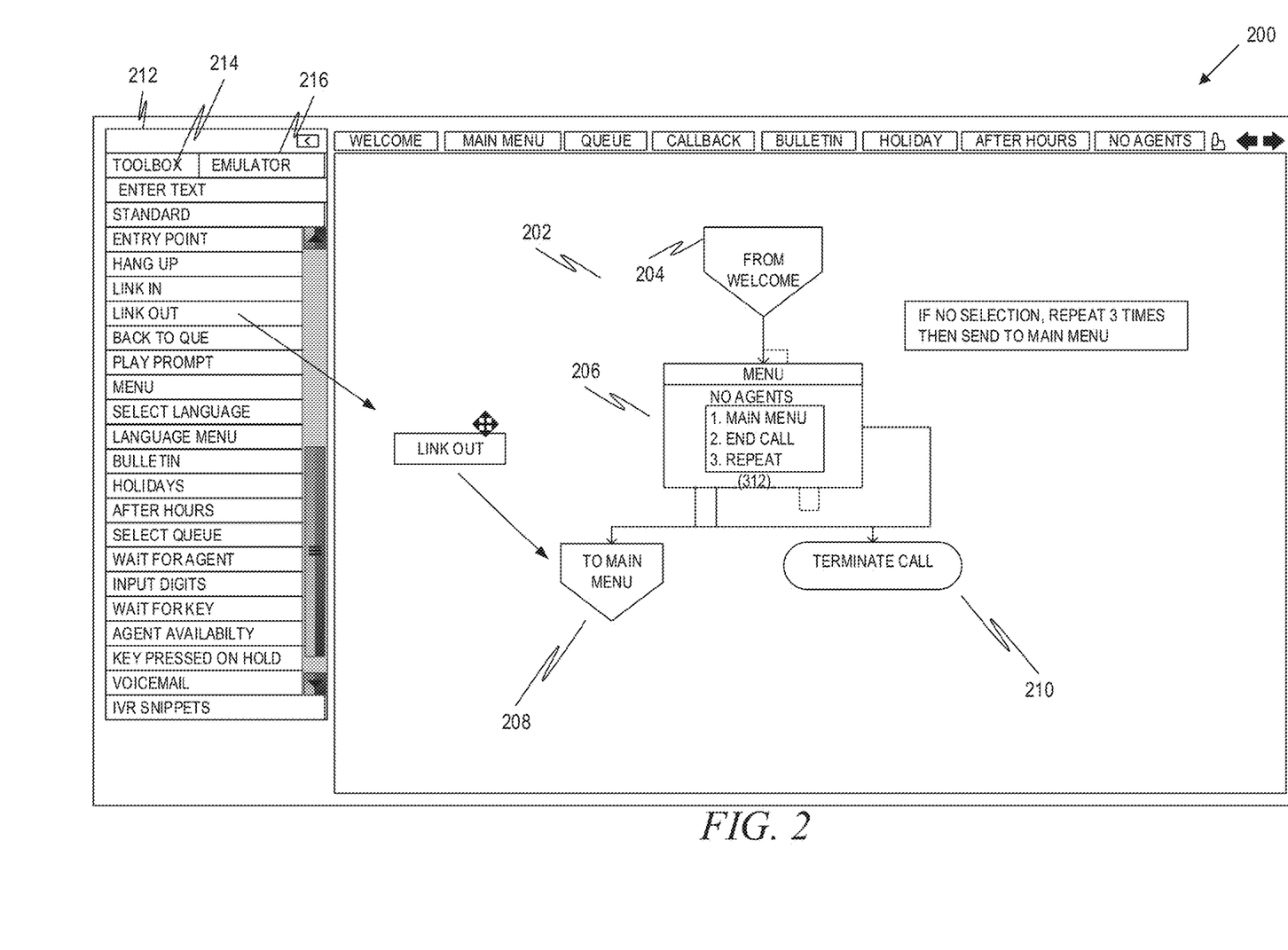
FIG. 2 is a screen capture illustrating a GUI of an IVR studio application, in accordance with an example embodiment.

IVR scripts are essentially flows designed by an administrator to guide users through one or more menu selections and collect and handle the selections. IVR scripts may be designed using a graphical user interface using IVR script creation software, such as an IVR studio application, which may be implemented in web application 126. The IVR studio application is a visual environment where a user can design IVR scripts. An IVR script provides full or partial automation of telephone events that may otherwise be performed by a live person, whereas the IVR script is a set of instructions written for a voice response system that tells it how to carry out an automated event. The IVR script defines the call flow and determines what callers hear and how callers respond to the system. FIG. 2 is a screen capture illustrating a GUI 200 of an IVR studio application, in accordance with an example embodiment. The script 202, comprises a sequence of nodes 204, 206, 208, 210 defining actions, as well as optionally one or more decision blocks, which decide which of multiple paths to execute in the script 202. Arrows connecting the icons point out the flow direction, with each icon representing a phone business function. Navigation page 212 comprises two tabs: toolbox 214 and emulator 216. Toolbox 214, when selected, lists all business function icons that can be added to the IVR script. Examples include comment, entrypoint, hang up, link in, link out, back to queue, play prompt, menu, select language, language menu, bulletin, holidays, after hours, select queue, wait for agent, input digits, wait for key, agent availability, key pressed on hold, voicemail, callback, transfer, set variable, conditional, conditional (range), speak phrase, bind phrase, wait time in queue, rule based transfer, queue geo-routing, Representational State Transfer (REST) web services call, set property, and checkpoint.

Comment is a free form comment field. Entrypoint is a beginning of an IVR script—the point where a phone number is dialed and callers enter the beginning of the IVR script. Hang up is the end of an IVR script, where the connection to the caller is terminated. Link in is a call flow continuation from another page in an IVR script. Link out indicates the need to go to a different page in the design.

Back to queue is used to indicate the caller has made a selection to leave the queue, but they should be sent back to the originating queue. Play prompt places a stand-alone (non-menu) prompt in a call flow. Menu indicates a caller selection within the call flow outside of a queue. Select language indicates the language selected. Language menu is the menu presented to callers to select their language of choice.

Bulletin indicates emergency messages that can be turned off and on by the administrator at will. Holidays is a standard system check that is triggered when a holiday is configured in an administrator portal. After hours is a standard system check that is triggered when a call arrives outside of business hours.

Select queue sends the caller to a specific queue. Wait for agent is where users configure an in-queue mix of message and music entertainment for callers on hold. Input digits is a function that triggers the caller to input digits. Wait for key is a standard system check that is triggered when a single digit is pressed on the telephone keypad. Agent availability is a standard system check that is triggered if for some unplanned reason all agents have logged out and the queues are not manned.

Key pressed on hold is where caller-selected options while in queue are configured. Voicemail is a function that triggers the caller to leave a voicemail. Callback is a final step in a callback template, which triggers the callback to be registered in the database and queued for action by an agent. Transfer is a function that will send a caller out of the IVR script to a specific phone number.

Set variable sets the value of a variable. Conditional is a standard system check that is triggered when a variable value is compared with a set defined value using an operator. Conditional (range) is a standard system check that is triggered when a variable value is compared with a range of values. Speak phrase places a spoken phrase (text to speech) in the call flow.

Bind phrase allows binding of phrases to variables. Wait time in queue is where the wait time in the queue is calculated and stored to a variable. Rule based transfer checks a geo routing ruleset of a key and returns the selected queue or transfer destination if found, which is used for dynamic rules based routing.

Queue geo-routing automatically checks a database for an appropriate geo-routing rule, which allows for distribution of calls based on caller location (to, for example, load balance queues). REST Web Service call is used to access data from or send data to an external source. Set property is used to set values in and control other business functions. Checkpoint is a point in the IVR script to log a count of a checkpoint, for reporting purposes.

The emulator 216 is selected when one wants to test an IVR script. It runs the script in an emulated environment to ensure that it is working properly.

Figure 3:
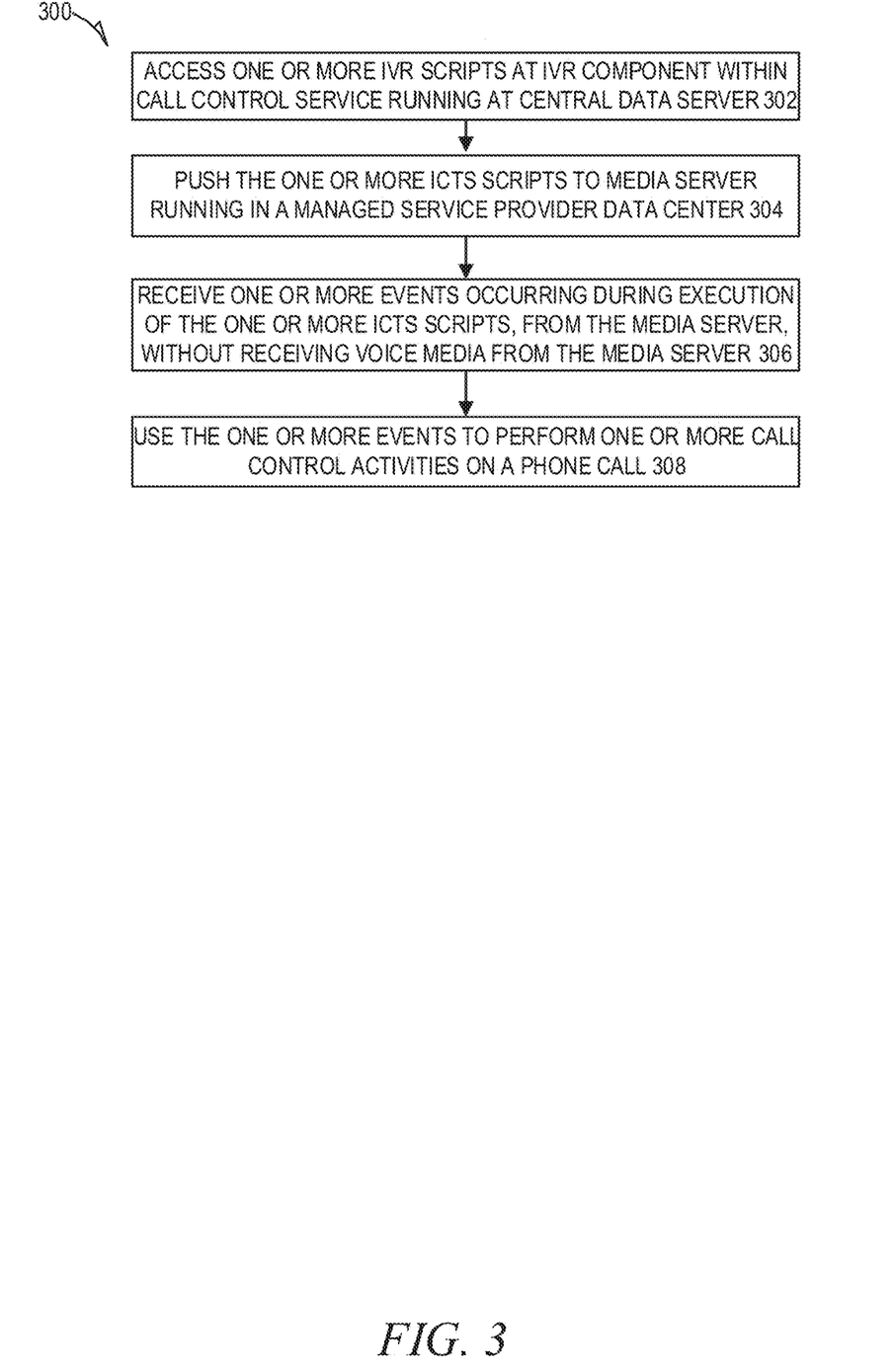
FIG. 3 is a flow diagram illustrating a method for distributing and executing one or more IVR scripts in accordance with an example embodiment.

FIG. 3 is a flow diagram illustrating a method 300 for distributing and executing one or more IVR scripts in accordance with an example embodiment. At operation 302, one or more IVR scripts are accessed at an IVR component contained within a call control service running at a central data center at a first geographic location. The one or more IVR scripts, when executed, perform a flow of automatic voice prompts to callers on phone calls. At operation 304, the one or more IVR scripts are pushed to a media server running in a managed service provider data center at a second geographic location.

At operation 306, one or more events, occurring during execution of the one or more IVR scripts, are received from the media server, without receiving any voice media from the media server. At operation 308, the one or more events are used to perform one or more call control activities on a phone call that corresponds to the one or more events. This may include, for example, initiating a transfer of the call to a live agent.

Figure 4:
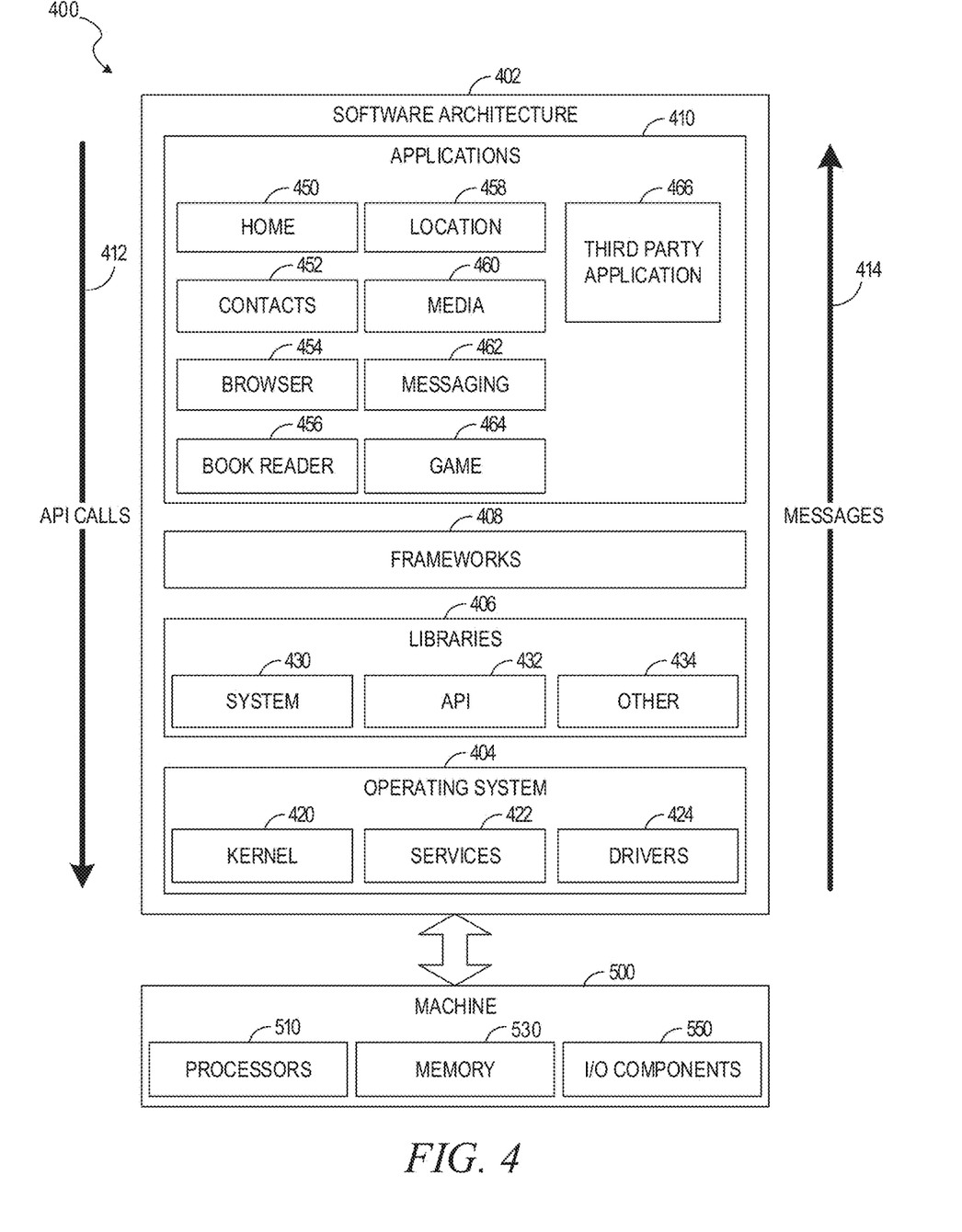
FIG. 4 is a block diagram illustrating a software architecture, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, Bluetooth® or Bluetooth® Low Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the Android™ or iOS™ software development kit (SDK) by an entity other than the vendor of the particular platform) may be mobile software running on a mobile operating system such as iOS™, Android™, Windows® Phone, or another mobile operating system. In this example, the third-party application 466 can invoke the API calls 412 provided by the operating system 404 to facilitate functionality described herein.

Figure 5:
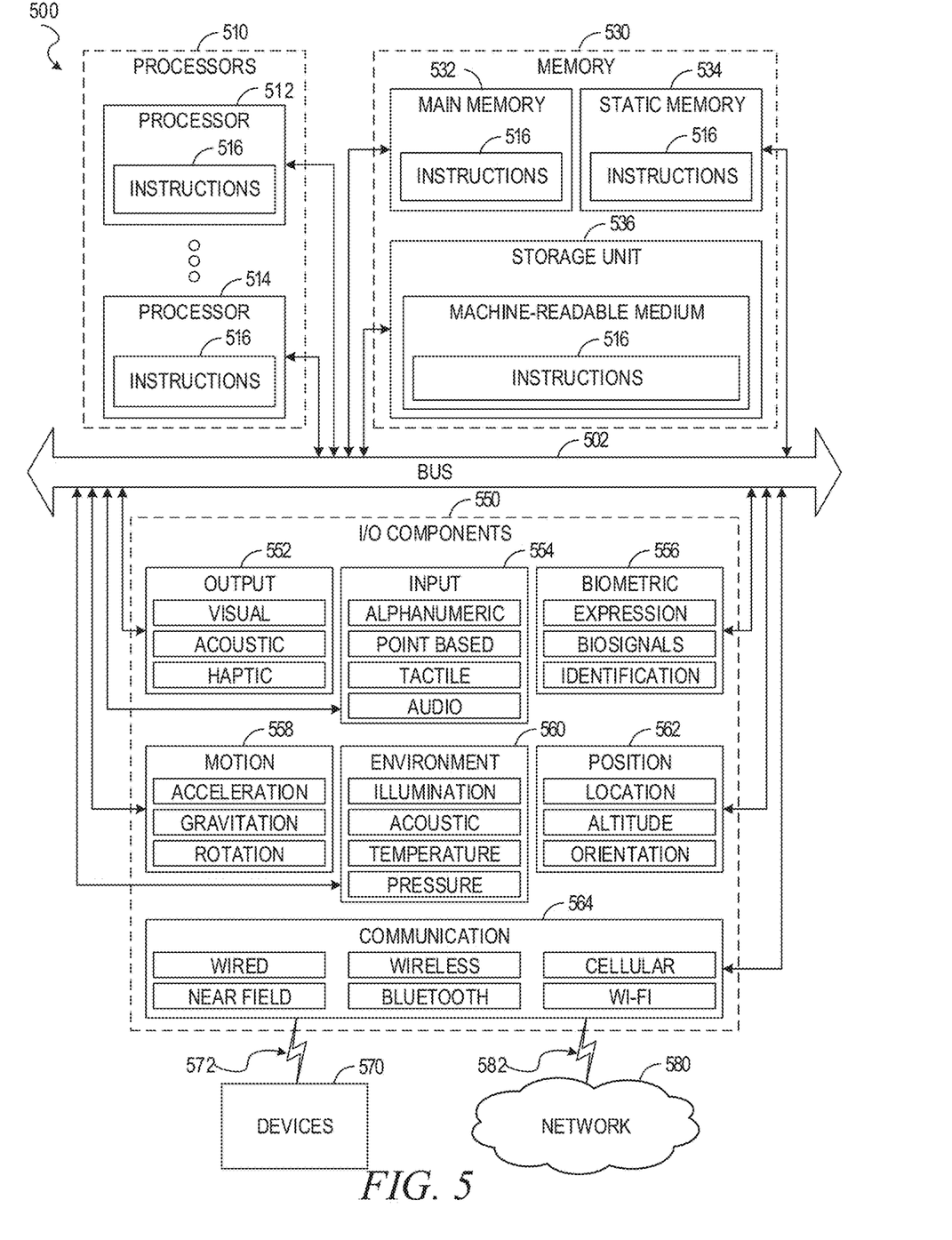
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application 410, an applet, an app, or other executable code) for causing the machine 500 to perform any one or more of the methodologies discussed herein may be executed. For example, the instructions 516 may cause the machine 500 to execute the method 900 of FIG. 9. Additionally, or alternatively, the instructions 516 may implement FIGS. 1-9, and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors 512 (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor), multiple processors 510 with a single core, multiple processors 510 with multiple cores, or any combination thereof.

The memory 530 may include a main memory 532, a static memory 534, and a storage unit 536, all accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine 500 will depend on the type of machine 500. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 516 and/or data. The terms shall accordingly be taken to include, but not be limited to, solid-state memories, and optical and magnetic media, including memory internal or external to the processors 510. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a central data center located at a first geographic location, the central data center comprising a call control service, the call control service containing an interactive voice response (IVR) component configured to remotely communicate, via a communications network, with a plurality of redundant media servers running in a managed service provider data center at a second geographic location; and
the IVR component further configured to transmit one or more IVR scripts to a database shared by the plurality of redundant media servers, the one or more scripts defining a flow of automatic voice prompts, corresponding menu selections, and instruction that, when executed, perform the flow of automatic voice prompts to callers and collect and handle corresponding selections from the callers.

2. The system of claim 1, wherein the managed service provider center further comprises a voice switch that connects to a public switched telephone network (PSTN).

3. The system of claim 2, wherein calls received via the PSTN are sent to a Session Initiation Protocol (SIP) high availability cluster that controls multiple instances of the media server.

4. The system of claim 1, wherein the one or more IVR scripts are pushed to the media server via an event service layer (ESL).

5. The system of claim 1, wherein the IVR component includes a web application that provides a graphical user interface for a user to create the one or more IVR scripts.

6. The system of claim 1, wherein the IVR component includes a plurality of redundant instances of the IVR component.

7. The system of claim 1, wherein the media server has one or more IVR services that have been disabled.

8. A method comprising:
accessing, at an IVR component contained within a call control service running at a central data center at a first geographic location, one or more IVR scripts, the one or more IVR scripts defining a flow of automatic voice prompts, corresponding menu selections, and instruction that, when executed, perform the flow of automatic voice prompts to callers and collect and handle corresponding selections from the callers;
pushing the one or more IVR scripts to a database shared by a plurality of redundant media servers running in a managed service provider data center at a second geographic location;
receiving, from the media server, one or more events occurring during execution of the one or more IVR scripts, without receiving any voice media from the media server; and
using the one or more events to perform one or more call control activities on a phone call that corresponds to the one or more events.

9. The method of claim 8, wherein the one or more call control activities include initiating a transfer of the call to a live agent.

10. The method of claim 8, wherein the managed service provider center further comprises a voice switch that connects to a public switched telephone network (PSTN).

11. The method of claim 10, wherein calls received via the PSTN are sent to a Session Initiation Protocol (SIP) high availability cluster that controls multiple instances of the media server.

12. The method of claim 8, wherein the IVR component includes a web application that provides a graphical user interface for a user to create the one or more IVR scripts.

13. The method of claim 8, wherein the IVR component includes a plurality of redundant instances of the IVR component.

14. The method of claim 8, wherein the media server has one or more IVR services that have been disabled.

15. A non-transitory machine-readable storage medium comprising instructions, which when implemented by one or more machines, cause the one or more machines to perform operations comprising:
accessing, at an IVR component contained within a call control service running at a central data center at a first geographic location, one or more IVR scripts, the one or more IVR scripts defining a flow of automatic voice prompts, corresponding menu selections, and instruction that, when executed, perform the flow of automatic voice prompts to callers and collect and handle corresponding selections from the callers;
pushing the one or more IVR scripts to a database shared by a plurality of redundant media servers running in a managed service provider data center at a second geographic location;
receiving, from the media server, one or more events occurring during execution of the one or more IVR scripts, without receiving any voice media from the media server; and
using the one or more events to perform one or more call control activities on a phone call that corresponds to the one or more events.

16. The non-transitory machine-readable storage medium of claim 15, wherein the one or more call control activities include initiating a transfer of the call to a live agent.

17. The non-transitory machine-readable storage medium of claim 15, wherein the managed service provider center further comprises a voice switch that connects to a public switched telephone network (PSTN).

18. The non-transitory machine-readable storage medium of claim 17, wherein calls received via the PSTN are sent to a Session Initiation Protocol (SIP) high availability cluster that controls multiple instances of the media server.

19. The non-transitory machine-readable storage medium of claim 15, wherein the IVR component includes a web application that provides a graphical user interface for a user to create the one or more IVR scripts.

20. The non-transitory machine-readable storage medium of claim 15, wherein the IVR component includes a plurality of redundant instances of the IVR component.

\* \* \* \* \*